US005957474A

United States Patent [19]

Mundy et al.

[11] Patent Number: 5,957,474

[45] Date of Patent: Sep. 28, 1999

[54] WHEELCHAIR FOR LARGE INDIVIDUALS

[75] Inventors: Phil Mundy, Vancouver; Duncan Newman; David Harding, both of Toronto, all of Canada

[73] Assignee: PDG Inc., Vancouver, Canada

[21] Appl. No.: 08/805,988

[22] Filed: Feb. 24, 1997

[51] Int. Cl.[6] .......... B62H 1/00

[52] U.S. Cl. .......... 280/304.1; 280/250.1

[58] Field of Search .......... 280/660, 688; 180/907; 277/DIG. 4

[56] References Cited

U.S. PATENT DOCUMENTS

| | | | |
|---|---|---|---|
| 5,320,373 | 6/1994 | Robertson | 280/304.1 |
| 5,382,036 | 1/1995 | Counts | 280/304.1 |
| 5,482,305 | 1/1996 | Jeffries | 280/304.1 |
| 5,507,513 | 4/1996 | Peters | 280/304.1 |
| 5,718,442 | 2/1998 | Alexander | 280/250.1 |

*Primary Examiner*—Peter M. Poon
*Assistant Examiner*—C. T. Bartz
*Attorney, Agent, or Firm*—Natan Epstein

[57] ABSTRACT

A wheelchair for large individuals includes front casters mounted substantially forward of the user's center of gravity. Front caster and rear wheels are mounted on the same rigid member. The rigid member is pivotally attached to the rear of the frame while the front includes suspension means extending between the rigid member and the frame. A side plate provides universal adjustability for positioning the backrest, for pivoting the armrests and for seat height and tilt adjustment. A telescoping tube engages the ground when the wheelchair is leaned back to prevent tipping.

11 Claims, 8 Drawing Sheets

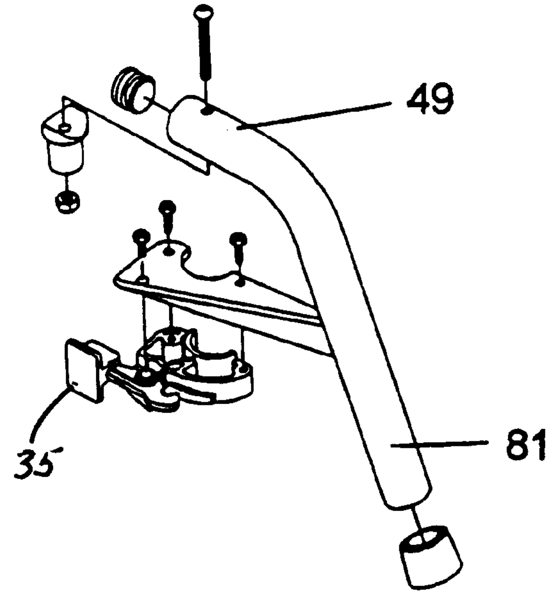
Figure 5A
Figure 5B
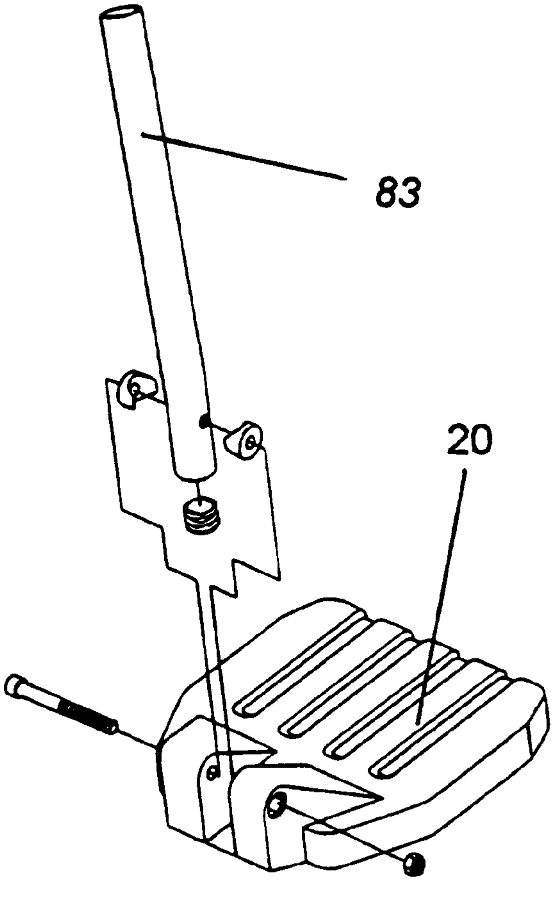

WHEELCHAIR FOR LARGE INDIVIDUALS

FIELD OF THE INVENTION

This invention relates to a wheelchair for transporting a person in a sitting position. More particularly, this invention relates to a wheelchair for carrying heavier than average individuals and to a wheelchair which can be adjusted to fit individuals having a variety of shapes and sizes.

BACKGROUND OF THE INVENTION

There exist several commercially available wheelchairs for individuals weighing in excess of 250 lbs. However, in all such cases, the wheelchairs are of a conventional design which has simply been reinforced, such as by the use of heavier tubing, additional gussets, additional cross bracing, larger diameter axles, heavy duty tires, and similar strengthening methods. In manufacturing these products the manufacturer does not substantially change the wheelchair design, i.e. the location of the seat and back in relation to the location of front and rear wheels, or the structural design of the wheelchair. Conventional wheelchairs and even prior art heavy duty wheelchairs are also subject to instability when carrying heavier than average persons.

In addition, prior art wheelchairs are usually made in a limited number of sizes such that a purchaser must select the appropriately sized wheelchair and is limited in the selection by the available sizes.

It is an object of this invention to provide a wheelchair which is specifically designed for individuals who are larger than average, i.e., larger than 250 lbs.

It is a further object of this invention to provide such a wheelchair which has improved stability, which can accommodate obstacles and can negotiate curves without tipping.

It is yet a further object of this invention to provide a wheelchair which is capable of being adjusted to accommodate individuals of different proportions, so as to allow more versatility for the user and to allow the manufacture of fewer sizes of wheelchairs to meet the needs of consumers.

SUMMARY OF THE INVENTION

Prior art wheelchairs are usually designed with the front wheels located almost immediately beneath the front seat support strut. The inventors have found that the center of gravity of heavy individuals is located much further forward in a wheelchair than is the case for individuals of average weight. When a heavy individual sits in a wheelchair designed for an average size individual, not only is much more weight exerted on the front casters, but more importantly heavy individuals have a much higher percentage of their weight carried on the front casters of the wheelchair due to the location of their center of gravity. The instability of conventionally designed wheelchairs when encountering small objects is due to the center of gravity being located too near the front casters. As soon as the wheelchair encounters an obstacle, the center of gravity moves forward and the chair risks overturning.

The wheelchair according to the invention is designed to accommodate the center of gravity of heavy individuals by having front casters which are placed as far forward as is practically possible, and rear wheels which may be adjusted forward and aft. The front casters therefore carry a lower percentage of the heavy user's weight and the rear wheels carry a higher percentage of the weight than would be the case for prior art wheelchairs. The result is a wheelchair with improved maneuverability and improved obstacle climbing capability.

The invention further includes suspension means including an elastomer shock absorber to enable each front caster to independently move up and over a small obstruction. This not only contributes to a smoother ride, but reduces the likelihood of the wheelchair overturning upon contact with an obstruction.

The invention also comprises means for adjusting seat depth, seat height, seat slope, backrest height, backrest angle, armrest height and wheel base so as to accommodate a broader range of users than conventional wheelchairs.

Accordingly, in one of its aspects, the invention comprises a wheelchair having a frame, rear wheels, front casters and a seat pan having a front edge, wherein the front casters are disposed substantially forward of said front edge.

In another of its aspects, the invention comprises a wheelchair having a frame, right and left rear wheels, right and left front casters and a seat pan having a front edge. The right rear wheel and right front caster are mounted on a first straight rigid member and the left rear wheel and left front caster are mounted on a second straight rigid member. Each of the front casters is mounted in a housing which is coplanar with its respective rigid member while the rear wheels are mounted on an axle which intersects the two rigid members.

In another of its aspects, the invention comprises a wheelchair wherein the front casters and rear wheels are mounted on rigid members. The rear of the rigid members are pivotally attached to a rear portion of the frame while the front of the rigid members is spaced from the front of the frame by suspension means extending between each of said rigid members and a forward portion of the frame.

In another of its aspects, the invention comprises a side plate mounted vertically on the wheelchair and selective adjustment of the vertical position of the rear wheels may be accomplished by a plurality of substantially vertically aligned holes in a downwardly extending portion of each of said side plates.

Additional details of various aspects of the invention are set out in the claims appended hereto.

DETAILED DESCRIPTION OF PREFERRED EMBODIMENT

The invention may be more fully appreciated by reference to the following description of the preferred embodiment and by reference to the drawings thereof in which:

FIG. 5A is an exploded view of the upper footrest assembly;

FIG. 5B is an exploded view of the lower footrest assembly;

Figure 1:
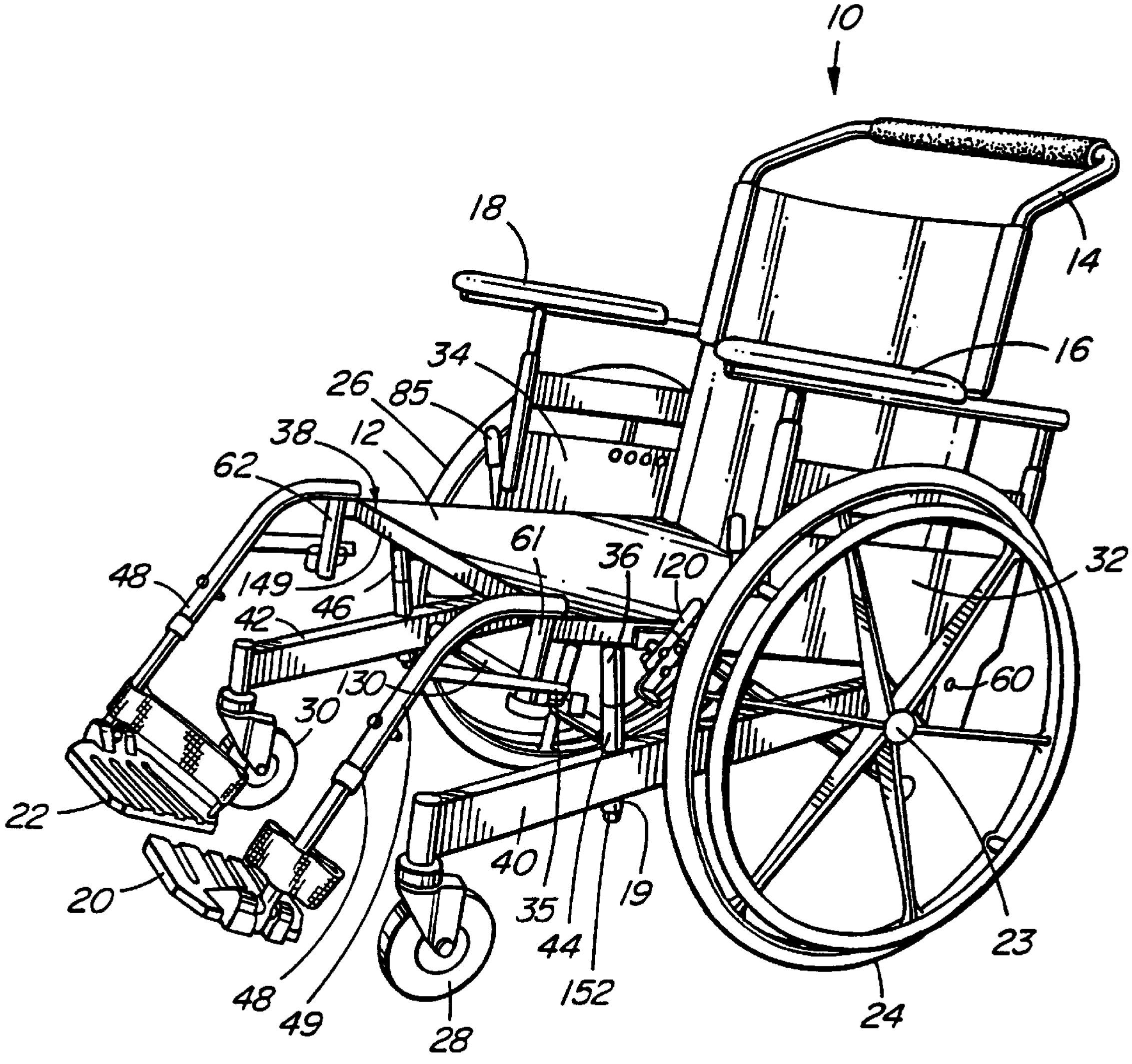
FIG. 1 is a perspective view of the wheelchair according to the preferred, embodiment of the invention.

Referring to the figures generally but particularly to FIG. 1, the wheelchair according to the invention in its entirety is designated by the numeral 10. The wheelchair 10 includes a seat pan 12, a backrest 14, armrests 16 and 18, footrests 20, 22, rear wheels 24, 26 and front casters 28, 30.

Side plates 32, 34 are provided for attachment thereto of seat support members 36, 38 (to which the seat pan 12 is attached), the armrests 16, 18 and wheel frame members 40, 42. On each wheel frame member is mounted a rear wheel and a front caster, all as more particularly described below.

Tubular struts 44, 46 extend between each wheel frame member and one of the seat support members near its forward end. The footrests 20, 22 are mounted at the end of a footrest tube assembly 48 extending forwardly and downwardly from the forward edge of each of the seat support members 36, 38.

Figure 4:
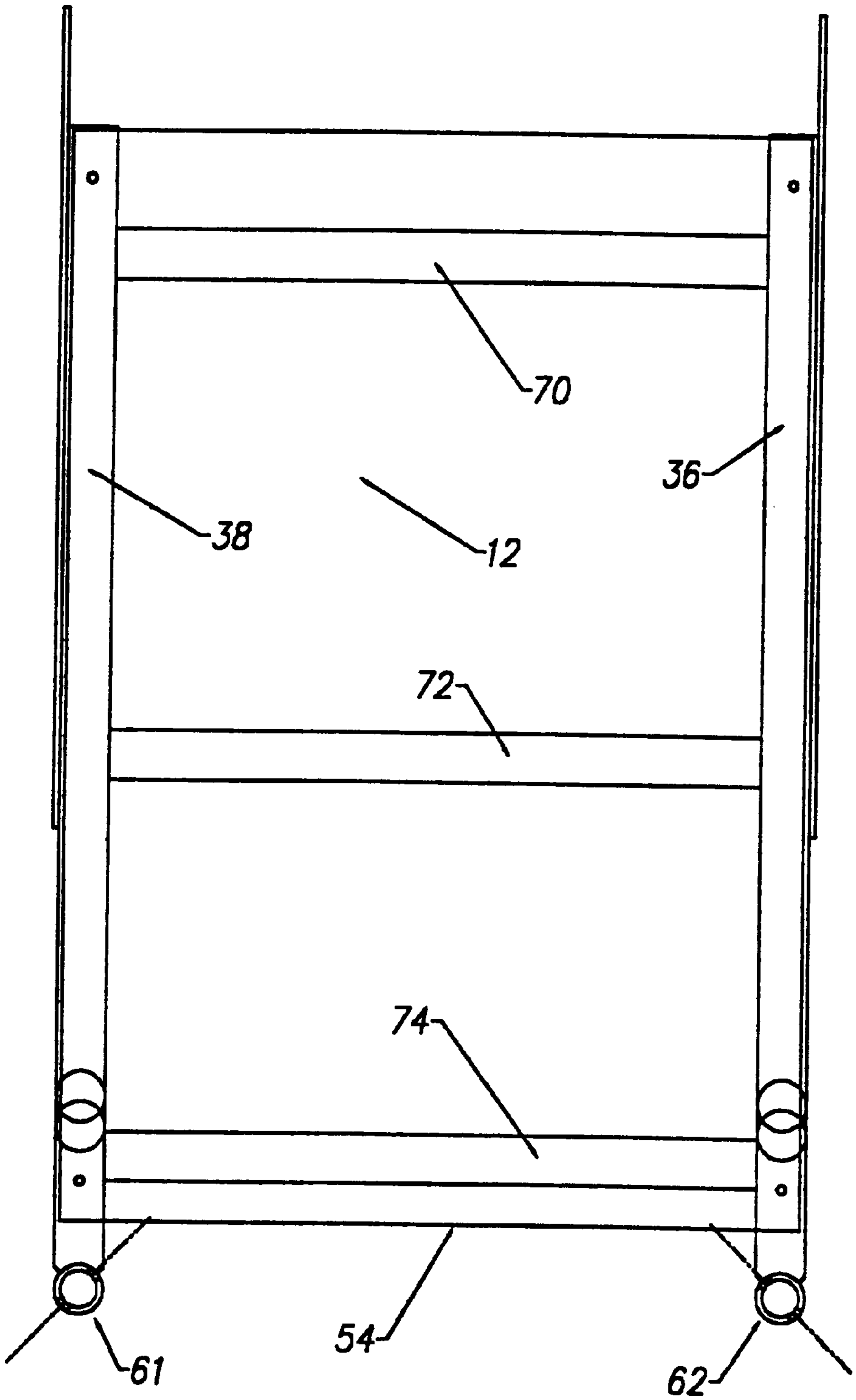
FIG. 4 is a bottom view of the seat pan, seat support members and transverse support members.

Seat support members 36, 38 are each of square cross section and extend from the front to the rear along the right and left sides of seat pan 12. Extending between and at 90 degrees to the seat support members 36, 38 are three hollow square cross section transverse support members 70, 72, 74 (best seen in FIG. 4) which abut seat pan 12 on their upper surfaces, thereby supporting the seat pan. Seat pan 12 consists of a rectangular plate which is bolted to seat support members 36, 38.

The following description may refer only to one side of the wheelchair where appropriate, it being understood that the wheelchair is symmetrical about its center axis.

Referring to FIG. 2, side plate 32 is generally rectangular and is mounted vertically and perpendicularly in relation to seat support member 36. In the preferred embodiment, side plate 32 is welded along the outer edge of seat support 36. A plurality of holes are provided in side plate 32 for accommodating adjustable positioning of wheel frame member 40 and backrest 14. Notches 64, 66 are formed in its upper front and rear corners for use in attaching armrest 16 as described below. A roughly triangular projection 68 extends in a downward direction from the lower rear portion of side plate 32.

The footrest arrangement as shown in FIG. 1, 5A and 5B will now be described.

The front ends of seat support members 36, 38 extend past the front edge 149 of seat pan 12 a distance sufficient to support the footrests (at least 4 cm). Each seat support member terminates at its forward end in a downward projecting hollow tube 61, 62 in which is secured the upper footrest tube assembly 81.

The top end of the hollow tube 62 abuts a horizontally mounted hollow footrest tube 49 which projects forward then downward at an angle of about 60 degrees below the horizontal. The preferred embodiment uses a 60 degree footrest angle to maximize the space available for the front casters 28, 30. The footrest 20 extends inwards from the lower footrest tube 83.

The footrest assembly 48 is of a standard type such as manufactured by Invacare Corporation of Elyria, Ohio, USA.

The footrest tube assembly 48 is locked by latch 35 such that the footrests 20, 22 are aligned facing one another. When latch 35 is disengaged, the footrest tube assembly 48 may be rotated outwardly.

The arrangement of the wheel frame members 40, 42, rear wheels 24, 26 and front casters 28, 30 will now be described by reference to FIGS. 1, 2A and 2B.

Wheel frame member 40 comprises a straight, rigid rectangular cross section member which is pivotally hinged by a pivot pin 60 inserted through one of three vertically aligned holes 76, 78, 80 formed in projection 68. Wheel frame member 40 extends from projection 68 diagonally forwardly and downwardly thereby forming an angle ranging from approximately 20 degrees to 40 degrees between wheel frame member 40 and seat pan 12 depending on the side plate 32 position and strut 44 adjustment.

Rear wheel 24 consists of a plurality of spokes radiating from a central cylindrical core 23 and abutting an outer rim covered on its outer surface by a tightly fitting tire. A push rim is attached by means of a plurality of connecting bolts, sleeves, and nuts to the outer side of and concentric to the wheel rim. A quick release axle is inserted in the wheel core 25. The quick release axle of a standard type is inserted into a bearing inserted in a quick release axle receiver which is selectively bolted to one of four rear wheel mount holes 54, 55, 56, 57 located in the rearmost portion of wheel frame member 40 such that the axle intersects the wheel frame members 40, 42. Rear wheel mount holes 54, 55, 56, 57 are preferably arranged along a horizontal plane on wheel frame member 40. However, it is within the scope of the invention to have such holes aligned along the longitudinal axis of wheel frame member 40.

The rear wheel 24 may be selectively positioned along the wheel frame member 40 according to which of holes 54, 55, 56, or 57 is used to mount the axle. These positions allow for location of the rear wheel axle generally forward of the rear edge of the seat pan 12 and more forwardly than is usually done in prior art heavy duty wheelchairs. Prior art heavy duty wheelchairs generally limited the placement of the rear wheel to a position immediately under the backrest support tube. The plurality of rear wheel mount holes also allows for a longer or shorter wheel base between the rear wheel 24 and front caster 28 for variable stability.

The forward end of wheel frame member 40 terminates in a substantially vertical tube 29 acting as a front caster housing which is coplanar with wheel frame member 40. Tube 29 is closed on its top surface and open on its bottom surface. A front caster 28 with an axle is attached to a caster connector 25 which is secured in the bottom of tube 29. The vertical tube 29 extends substantially forward of the front edge 149 of seat pan 12. This arrangement, particularly the fact that the front casters are mounted forward of the front edge of seat pan 12, enhances the stability of the wheelchair by compensating for the relatively more forward center of gravity of heavier individuals. The practical limit for this forward position is the point at which the caster interferes with the footrest. In the preferred embodiment the distance is 10 cm forward of the front edge of the seat pan 12 but any distance in excess of 4 cm is within the scope of the invention.

In the preferred embodiment, the footrest is positioned so that the user's lower leg will be at an angle of approximately 60 degrees. While 60 degree footrests are considered to be optimal, it will be appreciated that they may be positioned at other than 60 degrees from a horizontal plane which would allow the casters to be positioned more or less forward.

The preferred embodiment uses a 5" diameter front caster, and allows only enough room for the caster to swivel 360 degrees and not come in contact with the footrest. Other sizes of casters may be used. A 5" caster enables a sufficiently forward positioned front caster which is also able to roll over obstacles. Smaller casters experience more difficulty in rolling over obstacles. Larger casters roll over obstacles well but can not be forwardly positioned without interfering with the footrest.

The front casters extend substantially forward of the front edge of the seat pan and also forward of the substantial weight of the user providing a more stable wheelchair.

Adjustability of the rear wheel 24 position allows for a rear wheel substantially in line with the back of the user, or forward of the rear of the seat pan thereby transferring more weight to the rear wheels and rendering the wheelchair more stable and therefore more maneuverable for heavier individuals.

It will be observed that the wheel frame members connect the rear wheels to the front casters in a solid unbent member. Moreover, the coplanar arrangement of the casters with the wheel frame members and the fact that the rear wheel axle intersects the rigid members provides substantial strength and rigidity in the design. Most prior art wheelchairs do not have the front casters and rear wheels connected to a single rigid member but have several joints and/or connectors located within their system, leading to reduced rigidity and reduced strength.

The suspension system of the wheelchair will now be described.

Strut 44 extends at substantially a right angle from wheel frame member 40 upwardly towards a forward portion 52 of seat support member 36. The upper end of strut 44 consists of a downwardly extending hollow tube 45 welded to seat support member 36. A bolt 152 is inserted through a hole in wheel frame member 40 and is secured in tube 45. A cylindrical concentric shock absorber 47 is mounted between the bottom of tube 45 and the top surface of wheel frame member 40. The lower surface of the shock absorber 47 abuts the wheel frame member 40 on its bottom surface. In the preferred embodiment, the shock absorber 47 is comprised of an elastic material such as urethane. The shock absorber could also be a metal spring or other cushioning type material or mechanism. A hollow cylindrical urethane shock absorber 15 is inserted on the bolt 152 shaft such that the underside surface of the bolt 152 head abuts the lower surface of the shock absorber 15 and the upper surface of the shock absorber 15 abuts the bottom surface of the wheel frame member 40. The shock absorber 15 acts so as to eliminate any ‘bottoming out’ effect when the shock absorber 15 is unloaded after completing a compression cycle. The result is a reduced likelihood of the wheelchair 10 overturning upon contact with an obstruction as has been witnessed when using prior art designs. In an alternate embodiment, one or more spacers 19 may be mounted concentrically on the strut 44 such that the spacer’s 19 top surface abuts the bottom surface of the tube 45 and the bottom surface of spacer 19 abuts the top surface of the wheel frame member 40.

The compressibility of shock absorber 47 effectively allows the wheel frame member 40 to pivot about pivot pin 60, particularly when the front casters encounter bumps and obstacles. The right strut 44 including the shock absorber 59 and its corresponding wheel frame member 42 cooperate to provide independent suspension in relation to the left strut and wheel frame member. It will therefore be appreciated that the independent suspension system operates as the result of the pivoted relationship between the wheel frame member and the seat support member in combination with the strut and shock absorber.

When the wheelchair encounters an uneven surface, such as when the user attempts to proceed up a ‘curb cut’, the wheelchair frame is able to deform somewhat, reducing the likelihood of having one wheel temporarily off of the ground as the user proceeds on an uneven surface. This slight deformation of the frame gives this ‘rigid frame wheelchair’ improved stability since all four wheels stay on the ground and also reduces the effort required by the user to proceed up the curb slope. This reduction in effort required is as a result of the user not having to input all of the energy required to lift the front of the frame upon first encountering the curb cut. Instead, having the slightly deformable frame allows the user to input as much effort as is needed to get one caster proceeding up the slope, then input the effort required to get the second caster proceeding up the slope once the second caster reaches the base of the slope.

Figure 3A:
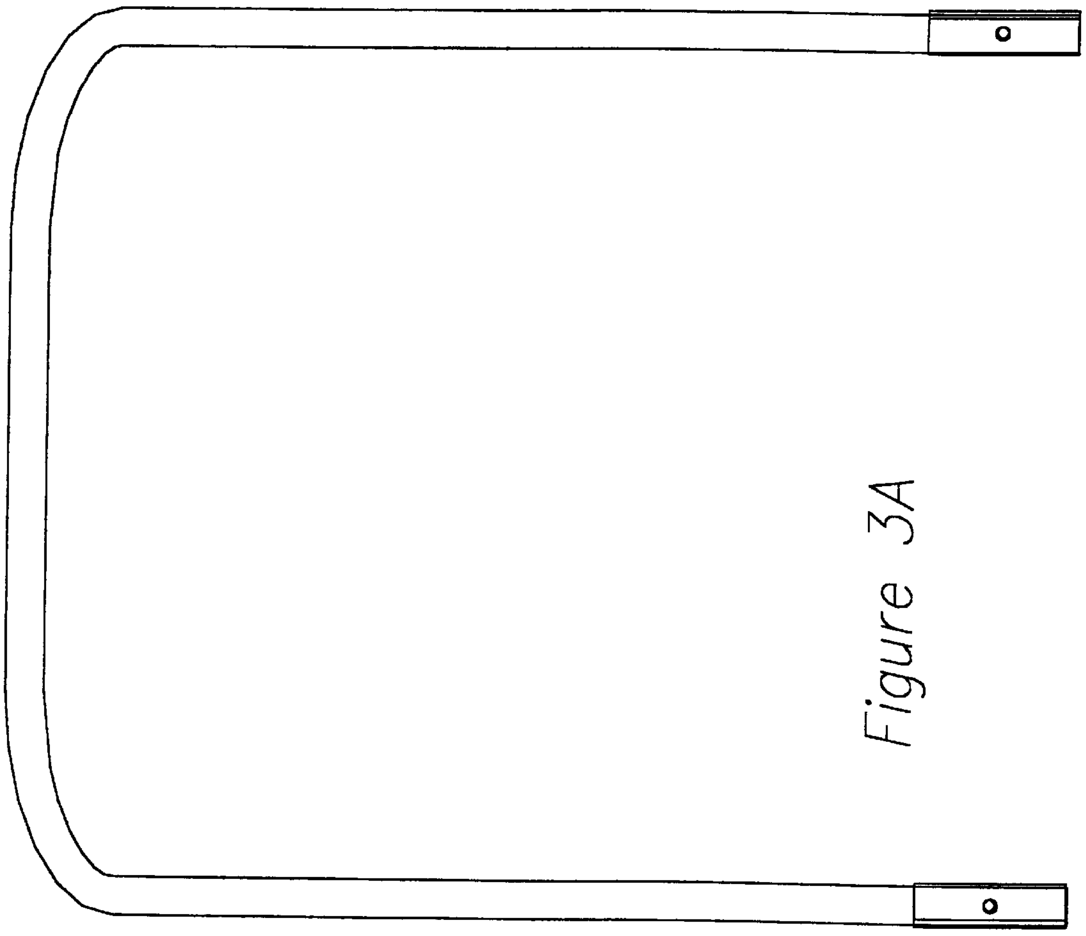
FIG. 3A is a rear elevation of the backrest assembly.
Figure 3B:
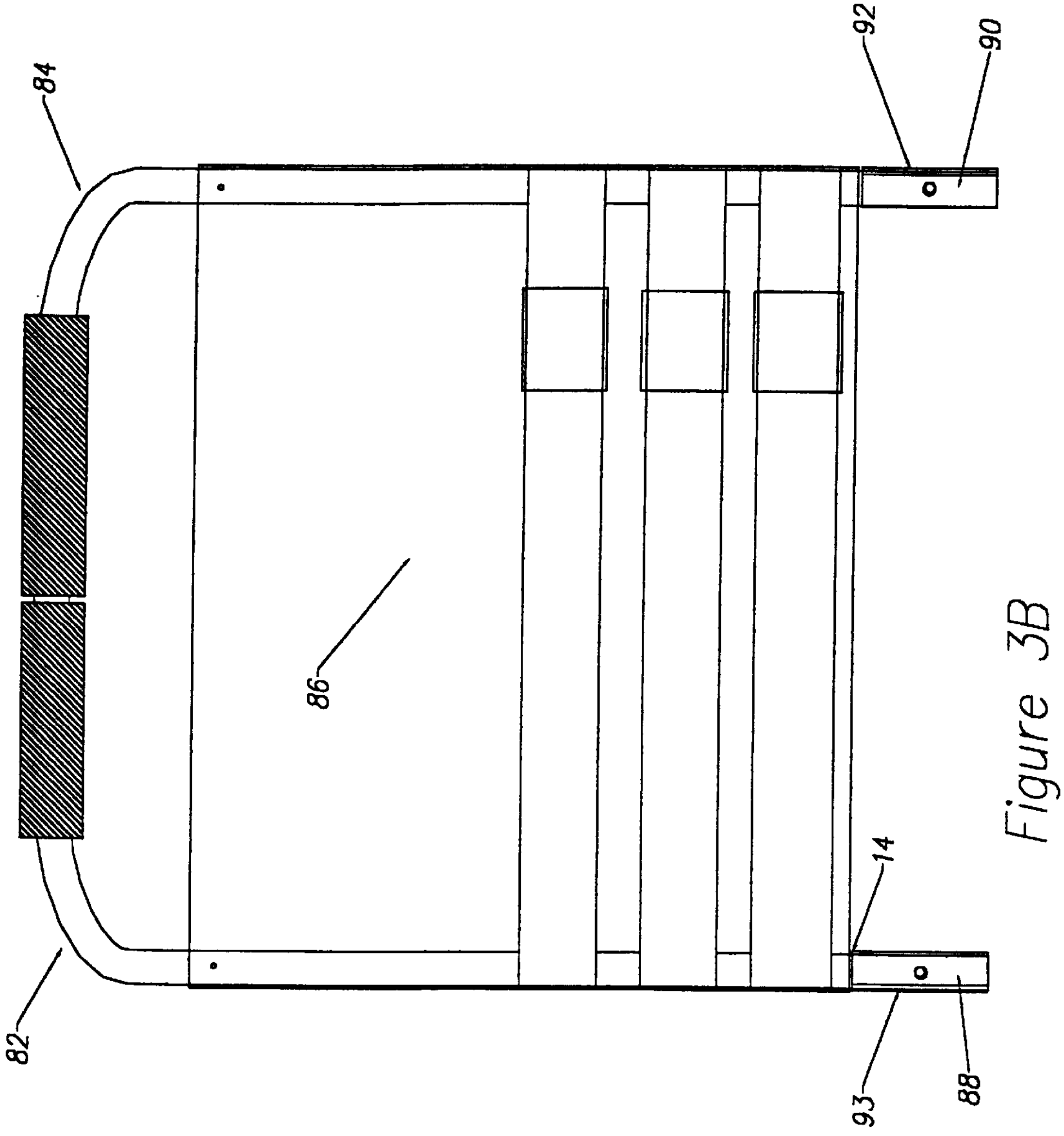
FIG. 3B is a rear view of the backrest assembly.

Referring to FIGS. 3A and 3B, the backrest in its entirety is designated by the numeral 14.

The backrest 14 consists of a cylindrical tube 82 bent into a vertical, horizontal and second vertical sections between which is provided upholstery 86. Each end of tube 82 is adapted to be snugly inserted in one of receiving tubes 88, 90. Receiving tubes 88, 90 are in turn provided with short tangential projections 92, 93 which in turn are provided with holes whereby to secure the receiving tubes 88, 90 to side plates 32, 34. Each receiving tube also includes a hole 94 therethrough corresponding to the position of a hole (not shown) at the base of tube 82, through which holes a cotter pin (not shown) is inserted to secure the tube 82 to receiving tube 88.

The upholstery method is similar to upholstery typically used in prior art wheelchairs with the exception that the present invention allows the lower half to the back to be ‘let out’ or expanded by selectively expanding or contracting a plurality of doubled over cloth straps with constraining buckles on the back surface of the upholstery, as illustrated in FIG. 3B.

Figure 2A:
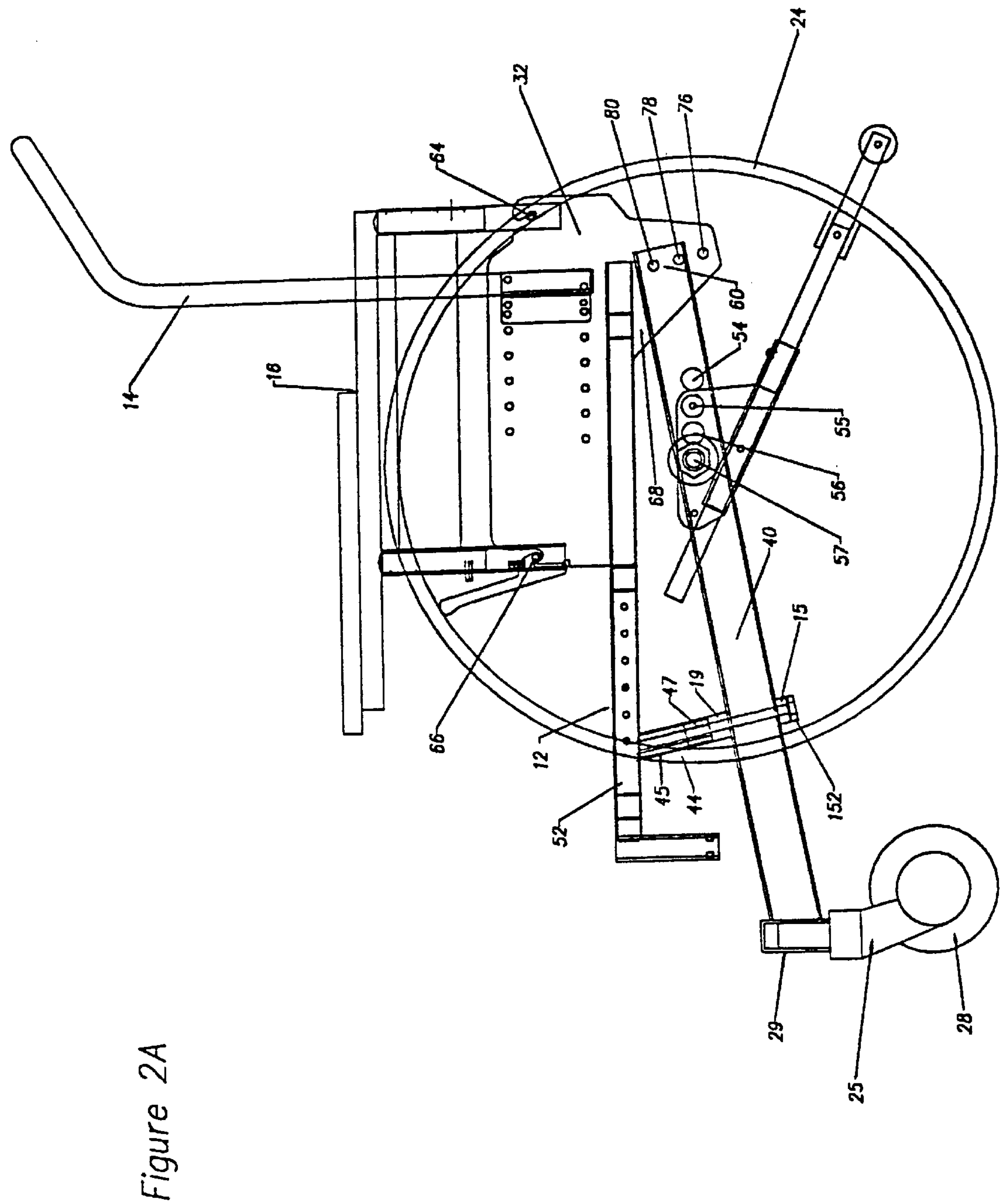
FIG. 2A is a left side view of the principal frame components of the wheechair according to the invention.
Figure 2B:
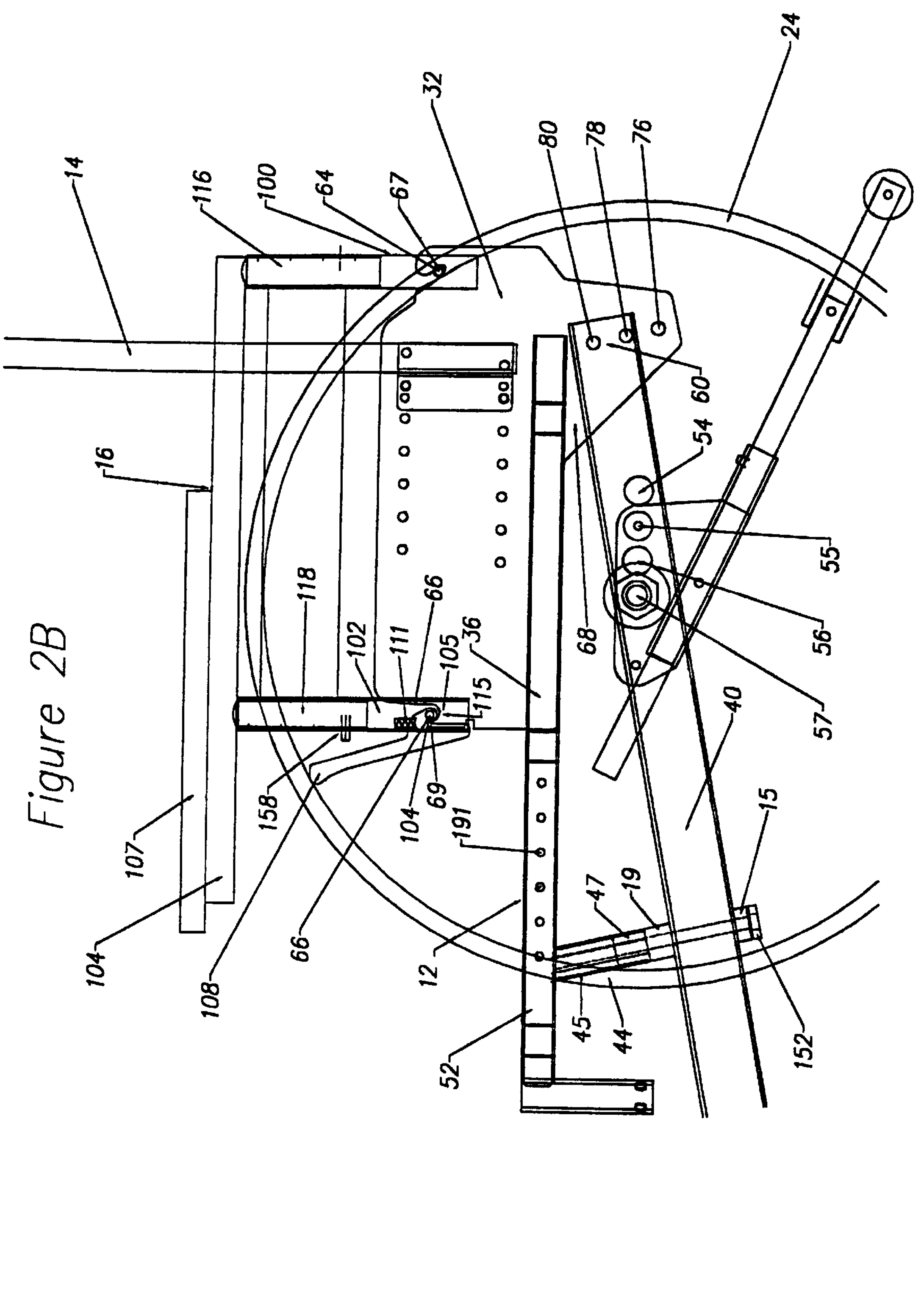
FIG. 2B is an enlarged view of a portion of FIG. 2A.

The armrest assembly is visible in FIG. 2B. A transverse pivot pin 67 is inserted in notch 64 in the top rear portion of the side plate. The pin is mounted transversely in the lower portion of a vertical tube 100. The lower front and lower rear portion of the vertical tube 100 have a slot (not shown but which is coplanar with the plane of FIG. 2B) of sufficient extent to allow insertion therethrough of side plate 32. An upper vertical tube 116 is inserted concentrically in the top end of the vertical tube 100. The top end of the upper vertical tube 116 abuts a horizontal tube 104. The horizontal tube 104 extends from the top of the rear vertical tube 100 past the front vertical tubes 102, 118. The front upper vertical tube 118 abuts the bottom surface of the horizontal tube 104 on its top surface. The lower portion of the front upper vertical tube 118 is inserted concentrically in a front vertical tube 102. The front vertical tube 102 extends downward such that it overlaps the side plate 32. The lower front and lower rear portions of the front vertical tube 102 have slots of sufficient width to allow insertion of the side plate 32 therethrough. A cylindrical bushing 105 is inserted in the lower portion of the forward vertical tube 102. The bushing 105 has a slot of sufficient width to allow insertion of the side plate 32, and a transverse hole of a dimension sufficient to allow insertion of the forward pin 69.

The front and rear vertical tubes 100, 102 have a plurality of holes in the front surface. The lower portion of the upper vertical tube 116 contains a strip of tensioned metal terminating in a pin 158 which abuts the interior rear surface of the upper vertical tubes 116, 118 then extends upwards then turns 180° to continue down the inside front surface of the tubes 116, 118 and projects out holes in the front surface. The pin 158 is selectively engaged in the plurality of holes in the front of vertical tubes 102, 118 to select armrest height.

Extending between the front and rear vertical tubes 102, 100 is a thin plate 106 used to provide stiffness and act as a clothing guard to keep the user’s clothing from becoming entangled in the rear wheels 24, 26. An armrest pad 107 is attached to the upper forward surface of the horizontal tube 104.

Exterior to the forward vertical tube is a latch 108 having a fulcrum extension 109 in its mid portion, a tang at its lower portion and a lever extending upwards and towards the front of the wheelchair. There is a hole 115 in the fulcrum extension to allow insertion of a pin 69. Interior to the forward vertical tube is a bushing 105 which is held in place by pin 69, and houses a spring 111 with a vertical centreline abuting the bushing 105 at its top end and the fulcrum extension at its lower end, thereby applying a force tending to rotate the latch 108 in a clockwise direction such that the tang engages the side plate notch and locks the armrest down in the extended position of the spring 111. By manually rotating the latch 108 in an anti-clockwise direction against the spring 111 tension the tang 119 is disengaged from the side plate notch 66 and the entire arm rest assembly 16 can be rotated around the rear pivot pin 67 in an anti-clockwise direction.

A hand brake 120 consisting of a conventional three bar link mechanism plus a mounting plate is used to join the mechanism to the seat support members, in a position corresponding to the selected rear wheel position. A series of mounting holes are required since the rear wheels are movable, requiring the wheel locks to move in concert.

Seat support member 36 shown in FIG. 2B includes a plurality of transverse holes 191 on the centerline. At least two bolts are inserted through the mounting plate 122, inserted selectively into the corresponding holes in the seat support member 36 to correspond with the selected rear wheel position.

At least one transverse tubular beam 130, shown in FIG. 1 extends at 90 degrees to the lower frame members between wheel frame members 40 and 42 and are attached by means of a weld or brazing. Beam 130 is positioned so as to provide strength and rigidity, yet not interfere with the functionality of the chair, for example by interfering with a users feet when foot propelling the chair. The transverse tubular beam can undergo sufficient bending to allow an independent suspension effect between the left and right suspension systems (wheel frame members and struts).

Figure 6:
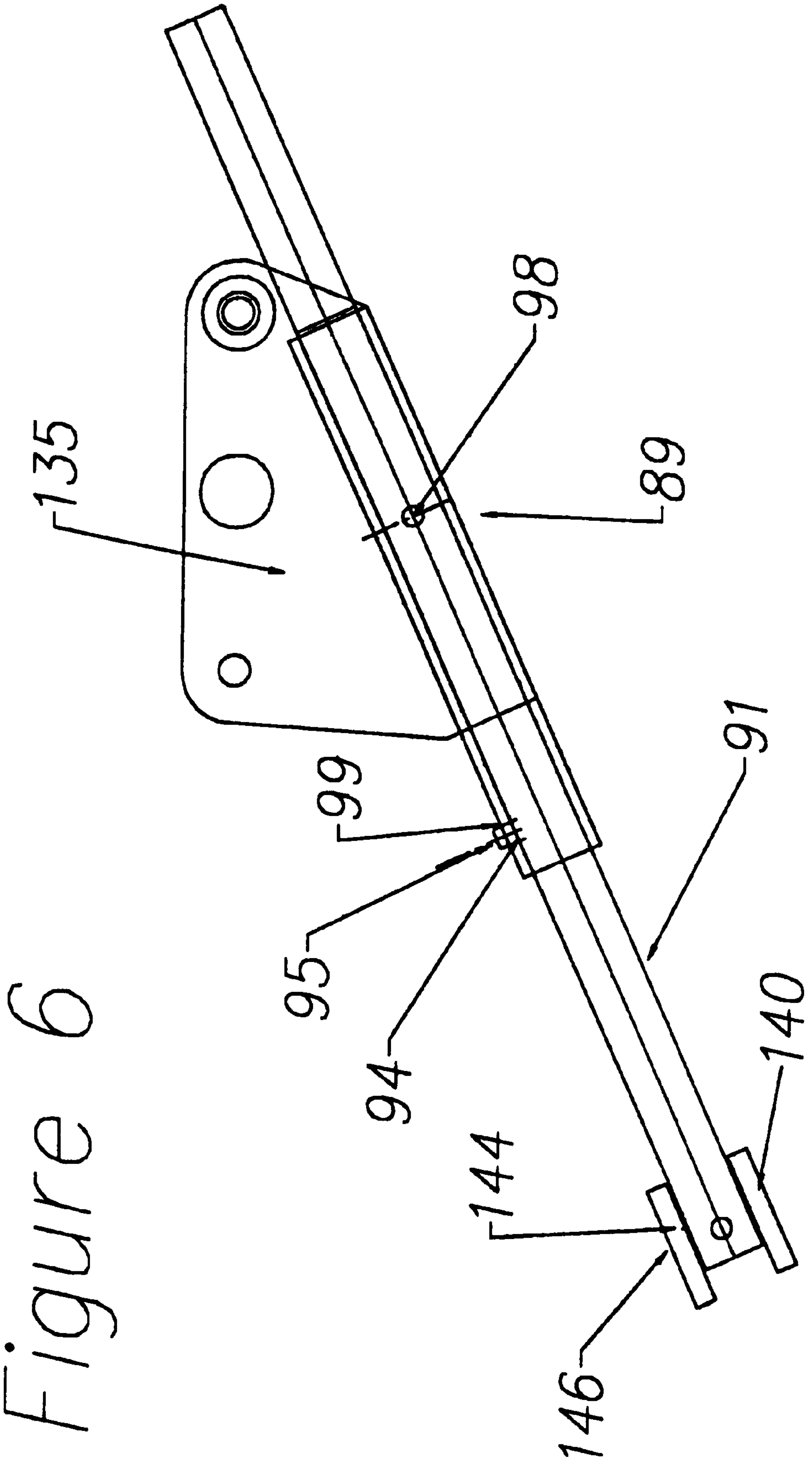
FIG. 6 is a side elevation of the anti-tip assembly.

An anti-tip assembly is provided and is depicted in FIG. 2A and FIG. 6 wherein the anti-tip assembly in its entirety is designated by the numeral 89. The anti-tip assembly 89 is designed to ensure that the wheelchair will not overturn if tipped back. A plate 135 with a roughly triangular shape having a plurality of holes aligned on a horizontal plane is connected to a receiver tube 88 by means of a weld on the lower interior portion of the plate 135. The plate 135 abuts the wheel frame member on its exterior surface. The rear wheel axle (not shown) extends through one of the plurality of holes in the plate 135, through one of the plurality of holes in the wheel frame member 40 and through a spacer 139 which abuts rear wheel 24 on its exterior surface and the wheel frame member 40 on its interior surface. The axle is secured at each end by means of a nut. A bolt with a washer on its shaft is inserted through one of the remaining open holes in the wheel frame member 40 which is aligned with the corresponding holes in the plate and the bolt is secured by a nut, effectively preventing the anti-tipping receiver from rotating about the axle receiver (not shown).

The hollow receiver tube 88 extends towards the rear of the wheelchair 10 at an angle below the horizontal. Interior and concentric to said receiver tube 88 is an extension tube 91, which extends below the rear portion of the receiver tube 88. There is one hole 94 in the mid to rear portion of the extension tube 91. Said hole corresponds selectively with an upper hole 98 and a lower hole 99 in the receiver tube 88, providing non-functional and functional operating positions respectively when the receiver tube 88 and extension tube 91 are secured by means of a pin 95 inserted through hole 94 and either hole 98 or 99. When the extension tube 91 is positioned in the 'non functioning position', the anti-tip extension tube assembly does not extend beyond the radius of the rear wheels. This position is desirable when the user wishes to undertake certain maneuvers in the chair such as proceeding down a curb. In this situation, if the anti-tip assembly is extended, the wheelchair would become 'hung up' on the curb. In the 'extended' or functional position, the lower end of the anti-tip extension tube extends at an angle below the horizontal and towards the rear of the wheelchair beyond the radius of the rear wheels so that if the wheelchair is tipped back, the end of the extended anti-tip assembly will contact the ground and prevent the wheelchair from overturning.

At the rear portion of the extension tube 91 casters 140, 144 having a radius greater than that of extension tube 91 are attached concentrically on two sides of the extension tube 91 by means of a bolt (not shown) passing transversely through the rear portion of the extension tube 91 and secured by a nut.

It will be appreciated that the side plates provide for adjustment of the seat height and tilt, thereby rendering the wheelchair more comfortable for individuals of varying sizes and degree of functioning. The side plates also allow for adjustment of the backrest recline and seat pan depth. A plurality of holes are provided near the upper and lower edges of side plate 32 to allow adjustment of the seat depth by attaching the backrest 14 selectively to the plurality of holes in the side plate allowing wheelchair configurations of 16"–22" seat depth and backrest recline of 85, 90, 95, and 100 degrees of recline.

When the backrest height is optimized, the backrest provides appropriate support to meet the needs of the user. High functioning users normally wish to have less support. Lower functioning users normally wish to have more (higher) support. When back recline is optimized, the backrest provides appropriate support to meet the needs of the user. This adjustment is most appreciated when an individual finds it difficult to bend to 90 degrees at the hips or if it is deemed beneficial for an individual to be seated with less than or more than a 90 degrees of hip flexion angle (i.e. digestion disorders).

Various seat pan heights are achieved through the use of spacers located between the lower end of the suspension bars 44, 46 and the point at which the spacers 19 (or shock absorber) contact the top of the wheel frame members. A corresponding height adjustment is made at the rear end of the seat pan 12 by inserting pivot pin 60 in one of holes 76, 78, 80 in the triangular projection of the side plate of an equivalent height thereby raising or lowering the seat support members 36, 38. Either the height adjustment of the front 149 of the seat pan 12 using spacers 19 or adjustment of the side plate 32 and pivot pin 60 may be made independently, thereby creating a seat pan 12 tilt. The preferred embodiment facilitates seat pan heights of 15", 16", 17" or 18" using a combination of 1" and/or 2" spacers, or by using no spacers. This allows easier transfer into or out of the wheelchair, more effective propulsion by the user, increased stability and comfort. If the person propels the chair by using one or both feet, or using one foot along the ground and one hand propelling the hand rim, having the seat elevation adjusted optimally will improve ability to propel the wheelchair. Seat depth requirements vary with the size of users and may also vary as an individual's needs change. For example, an individual who changes the method of wheelchair propulsion from using the hand rims to using one foot and one hand will likely require a change in both seat height and seat depth.

The maximum depth of the seat frame has been set at 22". The width of the frame is determined by the length of the three 1"×1" hollow steel members connecting the 22" long members together. The preferred embodiment accommodates widths varying from 18" wide to 26" wide, but other widths are possible using the design of the invention.

The armrests may be extended or contracted telescopically by depressing the armrest pins and sliding the upper vertical armrest tubes to the desired height within the lower vertical armrest tubes.

It will be appreciated that the preferred embodiment of the invention has been described in some detail but that the principles of the invention are not limited to the specific embodiment described herein.

What is claimed is:

1. A wheelchair having a frame including a vertically mounted side plate on each side of said frame and a rear portion consisting of a rearwardly and downwardly disposed portion of each of said side plates, right and left rear wheels, right and left front casters and a seat pan having a front edge, wherein the right rear wheel and right front caster are mounted on a first straight rigid member and the left rear wheel and left front caster are mounted on a second straight rigid member, each of said first and second straight rigid members are pivotally attached to said rear portion, each of said front casters is mounted in a housing on its associated rigid member, said rear wheels are mounted on an axle intersecting said first and second rigid members, and wherein the left and right front caster housings are coplanar with said second and first straight rigid members respectively.

2. A wheelchair as in claim 1 wherein said front casters are disposed at least 4 centimeters forward of said front edge of said seat pan.

3. A wheelchair as in claim 1 further comprising suspension means extending between each of said rigid members and a forward portion of said frame.

4. A wheelchair as in claim 3 further comprising means for selectively adjusting the position of the rear wheels in a forward and rearward direction.

5. A wheelchair as in claim 4 wherein said means for selectively adjusting comprises a plurality of holes in each of said rigid members into which holes a rear wheel axle may be selectively secured.

6. A wheelchair as in claim 3 further comprising means for selectively adjusting the position of the rear wheels in an upward or downward direction in relation to said frame.

7. A wheelchair as in claim 6 wherein said means for selectively adjusting comprises a plurality of substantially vertically aligned holes in a downwardly extending portion of each of said side plates.

8. A wheelchair as in claim 2 wherein said frame further comprises means for selectively attaching a hand brake to one of a plurality of horizontal positions according to the horizontal position of the rear wheels.

9. In a wheelchair having:

a frame having side plates mounted vertically on each side of said frame;

a seat pan having a front edge;

a right rear wheel and a right front caster mounted on a first rigid member, said first rigid member being pivotally attached to a rearward portion of said frame;

a left rear wheel and a left front caster mounted on a second rigid member, said second rigid member being pivotally attached to a rearward portion of said frame;

suspension means extend between each of said rigid members and a forward portion of said frame;

means whereby the height of a seat may be selectively adjusted comprising:

a plurality of substantially vertically aligned holes in a downwardly extending portion of a side plate mounted vertically on each side of said frame, said holes being adapted to receive a rear wheel axle; and spacer means adapted to selectively extend the length of said suspension means.

10. A wheelchair for carrying heavier than average users comprising:

a frame supporting a seat pan and backrest means;

a wheel frame member hinged at the rear of said frame, extending substantially forward of the front edge of the seat pan and front casters mounted at the forward end of said wheel frame member;

suspension means extending between said frame and said wheel frame member at the front of said frame.

11. A wheelchair as in claim 10 further comprising a side plate mounted on each side of said frame and a seat pan and wherein selective attachment of the seat pan to the side plates varies seat pan height and tilt.

* * * * *